March 22, 1927.

A. J. NORMAN

1,621,806

BANK LEDGER

Filed Jan. 16, 1926

Andrew J. Norman, INVENTOR.

Witnesses
C. E. Churchman Jr.

BY Richard B. Owen
ATTORNEY.

March 22, 1927.

A. J. NORMAN

BANK LEDGER

Filed Jan. 16, 1926

BEST AVAILABLE COPY

Fig. 2.

Andrew J. Norman INVENTOR.

Witnesses
C. E. Churchman Jr.

BY Richard B. Owen
ATTORNEY.

March 22, 1927.  1,621,806

A. J. NORMAN

BANK LEDGER

Filed Jan. 16, 1926    9 Sheets-Sheet 4

Andrew J. Norman, INVENTOR.

Witnesses

BY Richard B. Owen

ATTORNEY.

March 22, 1927.

A. J. NORMAN

BANK LEDGER

Filed Jan. 16, 1926

Andrew J. Norman, INVENTOR.

BY Richard B. Owen

ATTORNEY.

BEST AVAILABLE COPY

March 22, 1927.

A. J. NORMAN

1,621,806

BANK LEDGER

Filed Jan. 16, 1926

Andrew J. Norman, INVENTOR.

Witnesses

BY Richard B. Owen
ATTORNEY.

Patented Mar. 22, 1927.

1,621,806

UNITED STATES PATENT OFFICE.

ANDREW J. NORMAN, OF CALIFORNIA, PENNSYLVANIA; KATIE I. NORMAN EXECUTRIX OF SAID ANDREW J. NORMAN, DECEASED.

BANK LEDGER.

Continuation of application Serial No. 11,532, filed February 25, 1925. This application filed January 16, 1926. Serial No. 81,749.

This invention appertains to a novel bank appliance and the primary object of this invention is to provide novel means for bringing together signature cards, ledger sheets and check-stop-payment notices as a single unit, whereby the same can be properly displayed and placed before the paying teller or other proper bank official, thereby effectively preventing the payment of forged checks and checks which have been ordered "stop payment" which often occurs from carelessness or forgetfulness on the part of the proper bank official in systems now in vogue; and this application is a continuation of application Sr. #11,532, filed Feb. 25, 1925.

Another object of the invention is to enable the proper bank official to see whether the signature of a check is correct, to tell the balance, and see whether the check is stopped, all in one glance, without difficulty or delay or necessity of going to some other section to find the correct signature or to see whether the payment of the check is stopped, and to provide the inclusion of all of these elements in a ledger, which is before the eye of the proper bank official.

A further object of the invention is the provision of a novel expansible binder for clamping together signature cards and ledger sheets, and novel means carried by the binder for displaying the stop-payment notices.

A further object of the invention is the provision of novel means, of a releasable character, for holding the binder in its contracted position, whereby the various items contained therein will be prevented from displacement therefrom.

A further object is the provision of a novel releasable lock carried by the binder for engaging the signature cards display cards, so as to effectively hold the display cards in proper position irrespective of whether the ledger binder is opened or closed.

A further object of the invention is the provision of novel means for holding the covers of the binder in locked position and novel means for forming one of said covers for slidably receiving the stop-payment notice cards, whereby the stop-payment notice cards can be held in adjusted position relative thereto.

A still further object of the invention is to provide an improved bank appliance of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 9 is a detail vertical section taken on the line 9—9 of Figure 7 illustrating the releasing means for permitting the expansion of the sections of the binder.

Referring to the drawings in detail, wherein similar reference characters designate corresponding parts throughout the several views, the letter A generally indicates the improved ledger binder, B the stand for the binder, C the display cards associated with the binder for supporting the signature cards of the depositors, D the ledger sheets associated with the binder and E the supporting board for the stop-payment cards or notices.

The binder A forms an important part of the present invention, as the binder permits the bringing together of signature display cards, the ledger sheets and the stop-payment notices as a single unit and this binder embodies a novel base 25 having pivotally associated therewith the front and back covers 26 and 27 of the binder. The covers 26 and 27 can be formed of any preferred material, such as heavy cardboard, wood or composition board and are hingedly connected at their lower longitudinal edges by means of hinges 28' to the upper edge of the base 25 at the front and rear longitudinal edges thereof.

Figure 16:
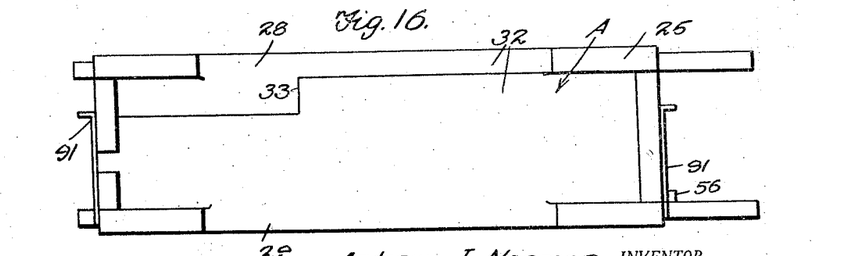
Figure 16 is a bottom plan view of the novel ledger binder in its collapsed position.

The base 25 of the novel ledger binder is of a novel construction and is so formed as to permit the expansion and contraction thereof, for a purpose which will be later described. The base includes front and rear sections 28 and 29 which are movable toward and away from each other and each section includes a front plate 30, which can be built up of a series of thin strips and the innermost strip of each plate is extended above the outer strips to form stops 31 for the hinge covers 26 and 27 to limit the inward swinging movement thereof. The plates 30 have rigidly secured thereto bottom plates or walls 32, which are notched or cut away as at 33, Figure 16, to permit the interfitting thereof when the base is in its fully contracted position. The front section 28 of the base 25 carries inwardly directed end walls 34 and these walls are slidably mounted within guides 35 carried by the rear section 29 and these guides can be formed of sheet metal if desired. Intermediate the end walls 34 is a partition wall 36 which is also carried by the front section 28 and this partition wall is slidably received within a guide 37 which is also preferably formed of sheet metal and the guide is secured to the rear section 29. This partition wall 36 in connection with the end wall 34 divides the base into the display card receiving compartment 38 for the signature cards and a compartment 39 for the ledger sheets.

Figures 2, 8:
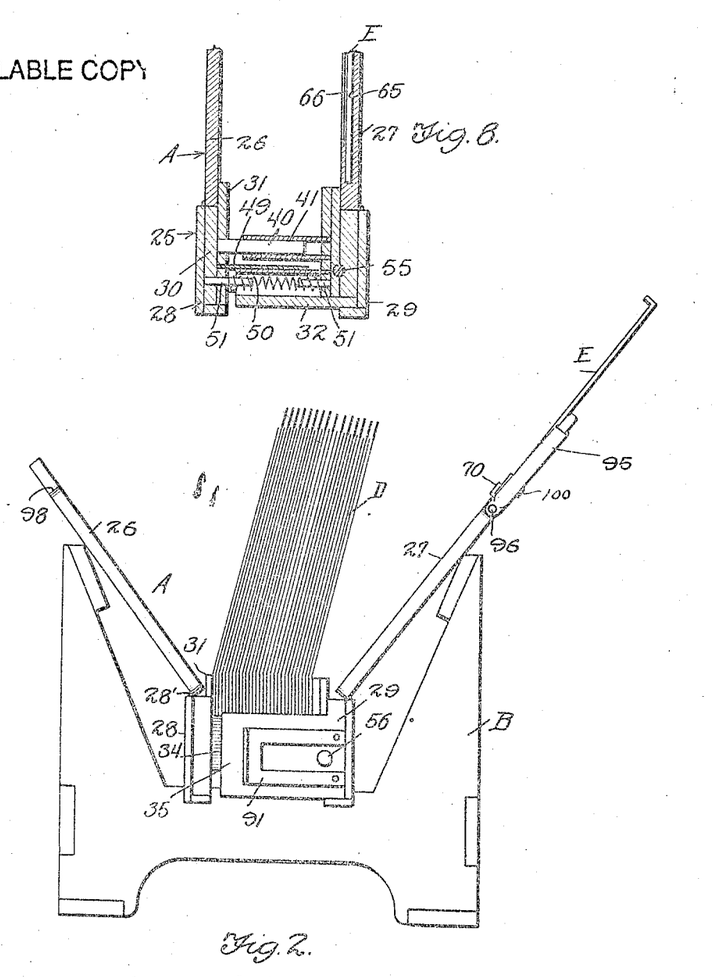
Figure 2 is an end elevation of the improved appliance in its open position showing the same in a supporting stand which can be provided therefor.
Figure 8 is a detail transverse section taken on the line 8—8 of Figure 6 illustrating the novel guides for the sections of the binder and means for normally urging the sections of the binder to their expanded open position.
Figure 19:
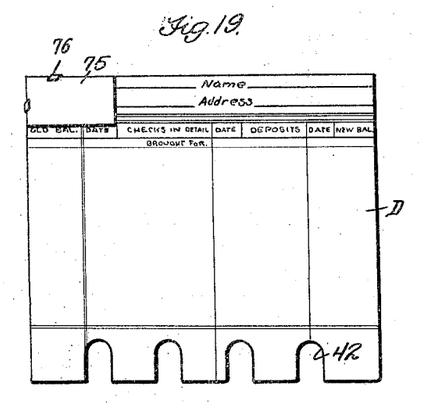
Figure 19 is a detail view illustrating the means of associating one of the signature cards with a ledger sheet.
Figure 20:
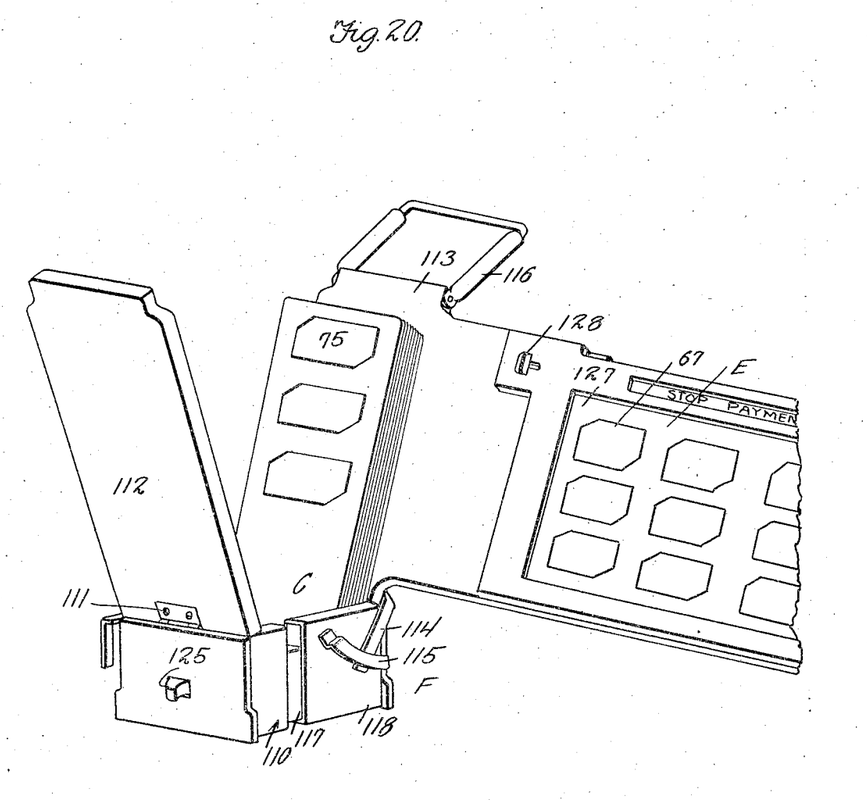
Figure 20 is a perspective view illustrating a modified form of the improved appliance.
Figure 21:
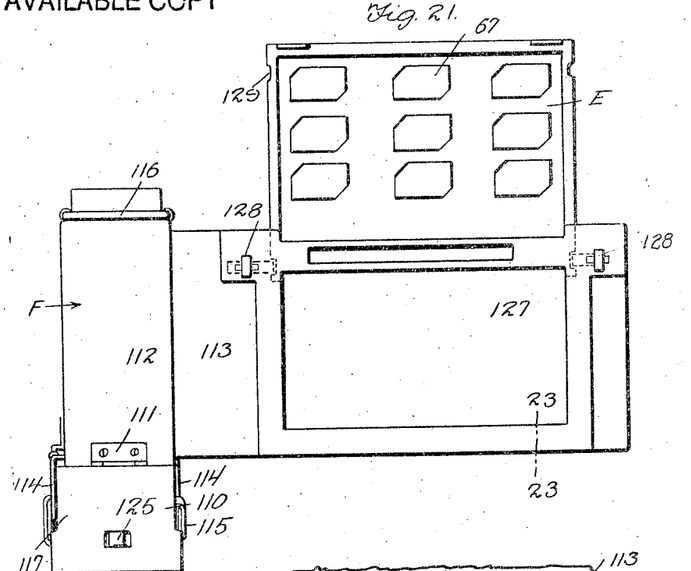
Figure 21 is a front elevation of the same.
Figures 22, 23:
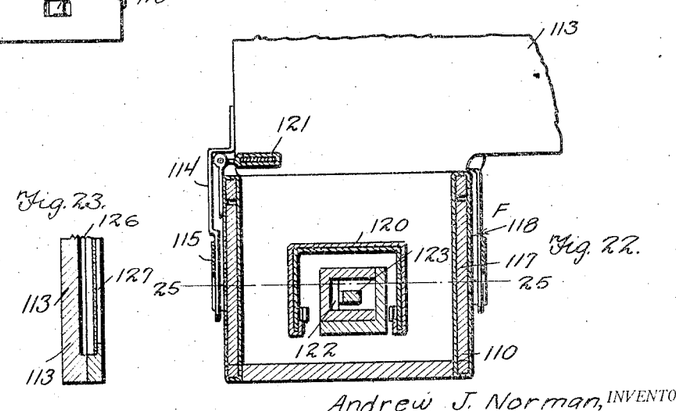
Figure 22 is a transverse section through the modified form of the appliance taken on the line 22—22 of Figure 21.
Figure 23 is a detail section taken through the back of the ledger binder on the line 23—23 of Figure 21.
Figure 24:
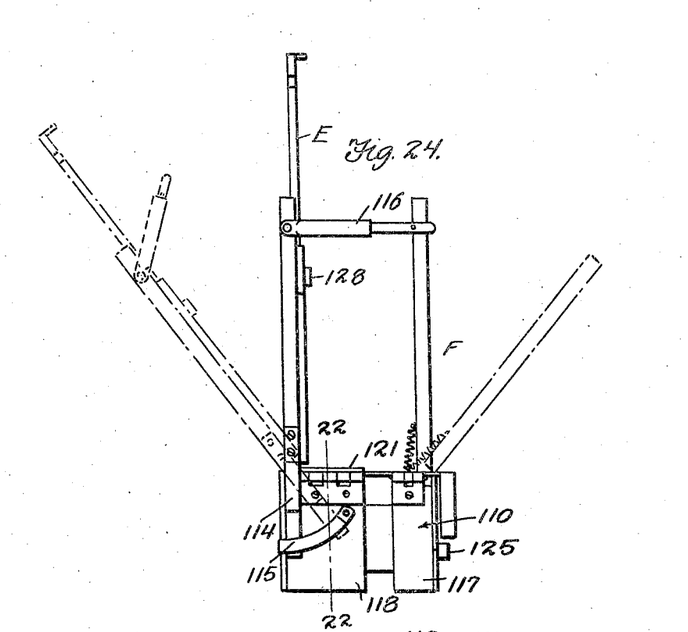
Figure 24 is a side elevation of the modified form of the novel ledger binder.
Figure 25:
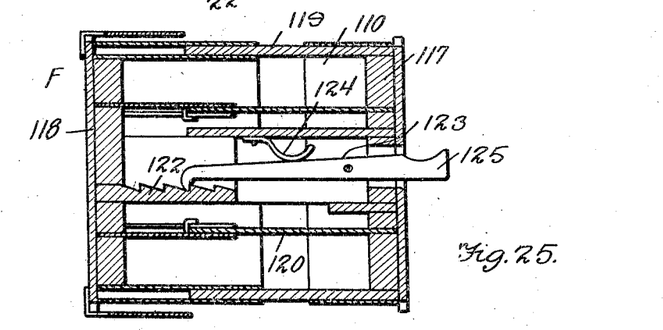
Figure 25 is a horizontal section taken on the line 25—25 of Figure 22 through the base of the novel ledger binder illustrating the means employed for holding the sections of the binder in their adjusted position.

The inner faces of the front and rear sections 28 and 29 have a plurality of transverse pins preferably four in number, which are indicated by the reference characters 40, secured thereto. These pins are in pairs in staggered relation; that is to say, two of the pins are carried by the front section and two carried by the rear section and are slidably fitted within guide tubes 41, which are likewise in staggered relation, being two mounted on one section and two mounted on the other section. The pins and guides serve to strengthen the binder and to insure the proper movement of the sections thereof and it is to be noted that the lower longitudinal edges of the ledger sheets are notched, as at 42, Figure 19, in order to fit over the said guide pins and tubes, and thus these guide pins and tubes form means for engaging the leaves to hold the same in proper position. Arranged within the compartment 38 is a telescoping guide 43 which is preferably formed of sheet metal and one section 44 thereof is secured to the rear plate 30 of the section 28 of the binder while the other part 45 is secured to the front plate 30 of the rear section 29 of the binder and it is to be noted that these guides are of substantially U-shape and that the outer section 45 is provided with inturned flanges 46 for engaging the inner part of the said telescoping guide. If preferred a suitable flooring or the like can be provided for the base of the binder and in the compartment 38 this flooring consists of overlapping sheet metal plates 47 and 48 and these plates can be secured respectively to the front and rear sections or formed upon the guide 37, for instance, and one guide 35. In the compartment 39 directly below one of the guide pins and tubes 40 and 41 is disposed a second guide 49, which is also of a telescopic nature and the guide is provided with extensions to form the bottom of the compartment. Disposed within the telescopic guides 43 and 49 are arranged expansion springs 50 and the guides form housings therefor. The springs bear against the opposite sections 28 and 29 and normally tend to spread the same. If preferred suitable pins 51, Figure 8, can be carried by the front and rear sections on which the terminals of the expansion springs 50 can be placed.

In order to normally hold the base in adjusted collapsed position against the tension of the springs 50 a transversely extending rack bar 52 is provided. This rack bar is secured to the inner face of the section 28 below the guide pins and tubes 40 and 41 and has the opposite longitudinal edges thereof provided with suitable rack teeth. These teeth of the rack bar 52 are adapted to be engaged by pivoted pawls 53 which are carried by the section 29, preferably by the bottom board or wall 32 thereof by pivot pins 52'. These pawls 53 are normally urged into engagement with the rack bar by means of leaf springs 54 and the inner ends of the pawls beyond the pivots are provided with arms 53' for a purpose which will now be described.

Figure 7:
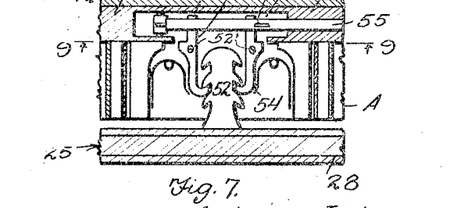
Figure 7 is a detail horizontal section taken on the line 7—7 of Figure 6 looking in the direction of the arrows and illustrating the novel means for holding the binder in its contracted position.
Figure 10:
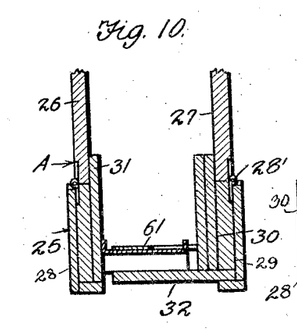
Figure 10 is a detail transverse section taken on the line 10—10 of Figure 6 illustrating the formation of the bottom of the binder against which the ledger sheets are adapted to fit and the means for limiting the opening movement of the binder sections.
Figure 11:
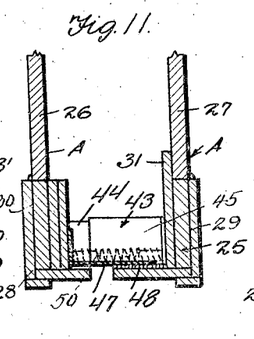
Figure 11 is a detail transverse section taken on the line 11—11 of Figure 6 illustrating the further formation of the bottom of the binder.
Figure 12:
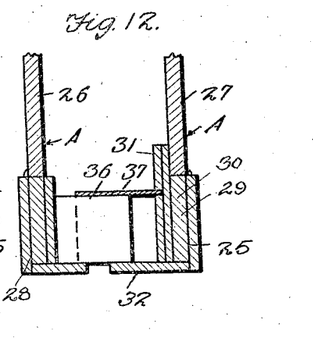
Figure 12 is a detail section taken on the line 12—12 of Figure 6 showing the partition for the binder to form the sections for the display signature cards and the ledger sheets.
Figure 13:
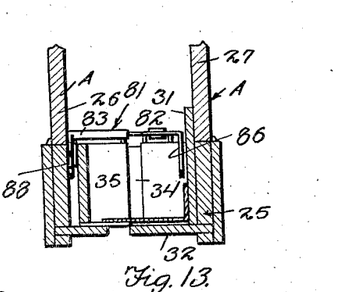
Figure 13 is a transverse section taken on the line 13—13 of Figure 6 looking in the direction of the arrows illustrating the novel lock for engaging the display cards for the signature cards.
Figure 14:
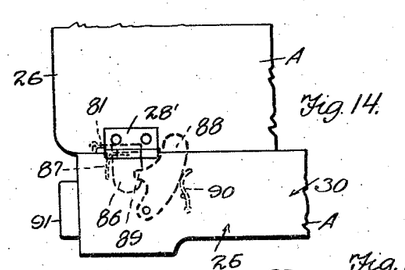
Figure 14 is an enlarged fragmentary front elevation of the binder showing the novel catch for the signature-display-card lock.

In order to permit the moving of the spring-urged pawls 54 from out of engagement with the rack teeth of the rack bar 52, an operating rod 55' is provided. This operating rod 55 is slidably mounted within the wall 30 of the rear section 29 and is extended outward of one end thereof and provided with a thumb knob 56. The wall 30 of the section 29 of the binder is cut away to provide a chamber, Figures 7 and 9, through which the manipulating or operating rod 55 extends and the rod at a point intermediate its ends is provided with a depending lug 58, Figure 9, which is disposed in the path of one arm 53' of one pawl 53. The inner end of the rod 55 normally engages the upper end of a pivoted lever 59 which is rockably mounted at a point intermediate its ends in the chamber 57. The lower end of the lever 59 engages a push rod 60 which in turn engages the arm 53' of the other pawl 53. It is thus obvious from this construction that when the operating rod 55 is pushed inwardly by the push button 56 that the lug 58 will engage one arm of one pawl and rock the same while the inner end of the rod will rock the lever 59. The lever 59 will push in on the rod 60 and rock the other pawl, thus both of the pawls 53 will be swung synchronously out of engagement with the rack bar 52 allowing the expansion of the binder. The rack bar and the pawls are provided with telescoping cover plates 61, which are carried respectively by the front and rear sections 28 and 29 of the binder.

Figure 15:
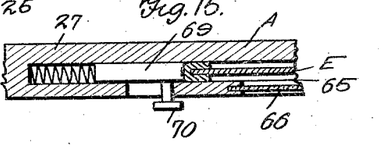
Figure 15 is an enlarged detail horizontal section taken through the back cover of the ledger binder illustrating the means employed for holding the stop-payment notice card in its raised and lowered position.

The rear cover 27 of the binder is provided with a pocket 65 and this pocket is provided with a transparent panel 66 at the inner side of the cover. This pocket slidably receives the stop-payment board E which in turn carries a plurality of small stop-payment cards 67 on which is carried the desired information relative to the stopping of the payment of predetermined checks. This stop-payment board or card is provided with suitable slits in which the small cards 67 can be inserted. The transparent panel 66 allows these cards 67 to be readily seen, but when the ledger binder is in use, it is preferred to hold the board in a raised position, so that all of these cards 67 can be readily seen. The side edges of the stop-payment card or board are notched as at 68 and these notches are arranged adjacent to the upper and lower edges respectively of the said stop-payment card or board. The rear cover 27 itself carries sliding spring-pressed latch bolts 69, Figures 6 and 15, adjacent to the upper edge thereof and these latch bolts are in such a position as to normally fit within the upper notches 68 of the display board, so as to hold the board against accidental displacement from the cover. When the board is raised to its displaying position the latches will engage the lowermost notches 68 and thus hold the board against downward movement. As stated the latches 69 are spring-pressed and are provided with manipulating heads 70 so as to permit the operation of the said latches.

When the ledger binder A is in use, it is preferred to place the same upon the stand B, which will not be described in detail, as the same can be of conventional construction, but it is to be noted that the lower face of the base 25 of the ledger binder is to be provided with shoulders so as to prevent movement of the binder longitudinally on the said stand.

Figure 17:
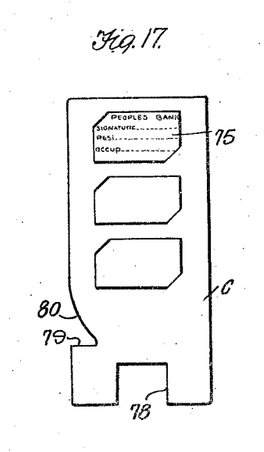
Figure 17 is a detail view of one of the display cards for the signature cards, three of the signature cards being shown associated with the display card.

As heretobefore stated the compartment 38 of the ledger binder is adapted to receive the novel display cards C, while the compartment 39 is adapted to receive the ledger sheets D, which are of conventional construction. The display cards C are of elongated character, as can be seen by referring to Figure 17 of the drawings, and each of the display cards is adapted to receive and support three signature cards 75 and thus only one display card C will have to be provided for three ledger sheets.

It is therefore preferred that each display card C will have a thickness equivalent to three of the ledger sheets D whereby the space of the display card C and the ledger sheets D will equally space apart the walls of the binder A.

It is also preferred to have each of the signature cards 75 provided with a diagonally extending clip 76 at one corner thereof, which is preferably formed of celluloid of a transparent nature. The terminals of the clips 76 are bent around the edges of the adjacent edges of the card and secured thereto in any desired way, such as by a suitable adhesive.

Figure 18:
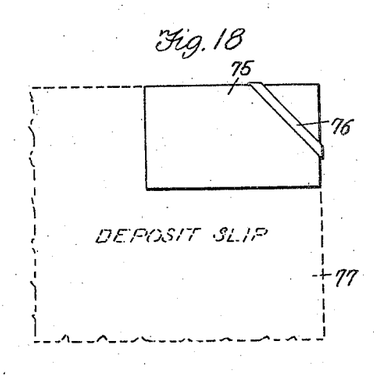
Figure 18 is a detail view illustrating the means of associating one of the signature cards with a deposit slip.

Thus in the initial use of the signature card, when the same is filled out by a new depositor, the deposit slip, indicated by the reference character 77 in Figure 18, which can be filled out by the clerk at the bank, is simply slipped through the celluloid strip or catch on the signature card, which is then ready to hand to the bookkeeper. When the account is closed, the signature card is removed from the display and supporting card and attached to the ledger sheet in the same manner as the deposit slip, as is clearly shown in Figure 19 of the drawings. The ledger sheet is then ready to file away, so that in case the depositor again opens his account, the sheet can be simply taken out and the signature card is again ready to file in the ledger binder.

Figure 6:
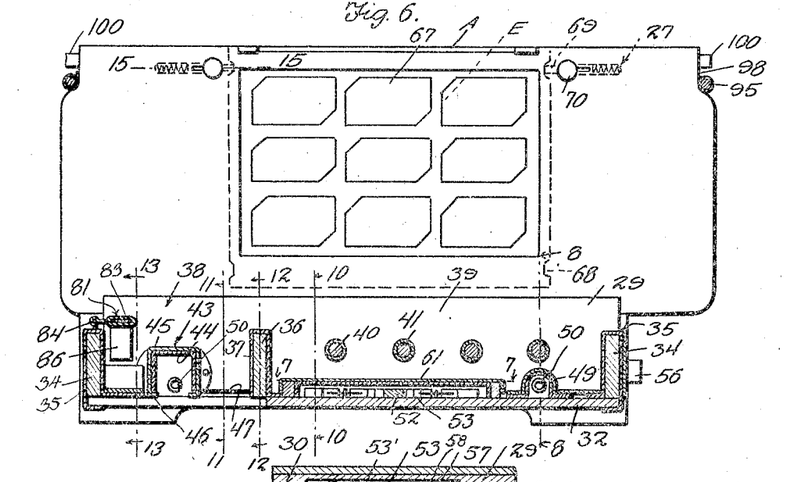
Figure 6 is a vertical longitudinal section through the improved binder taken on the line 6—6 of Figure 5 looking in the direction of the arrows.

It is to be noted that the lower edge of the display card C is provided with a notch 78, so that the cards can be readily placed in the compartment 38 of the binder over the guideway 43 which serves as means for holding the cards in position against displacement. The outer longitudinal edge of the signature card is further provided with a notch 79 having an arcuate upper wall 80 as clearly shown in Figure 17. This notch 79 is provided, so that the cards C can be positively locked in the binder against accidental displacement irrespective of whether the binder is in its open or closed position and in order to hold the cards in their locked position in the binder, a novel swinging catch or lock 81 is provided. This swinging catch or lock 81 includes inner and outer sections 82 and 83 respectively, which are hingedly connected as at 84 to one end wall 34 and the guide 35 thereof. The sections 82 and 83 are telescopically arranged, so that the lock can conform to the active side of the binder during the adjustment thereof and it is to be noted that the section 82 is provided with an inwardly directed tongue 85 which is slidably mounted within the section 83. The outer ends of the sections 82 and 83 are provided with right-angularly disposed feet 86 which are adapted to grip the sides of the display cards C and when the lock 81 is moved to a horizontal position as shown in Figure 6 of the drawings, the same is adapted to lie within the notches 79 of the cards D. A leaf spring 87 is carried by the front wall 30 of the base of the binder and is arranged in the path of the section 82 of the catch or lock, and this spring will normally tend to urge the catch or lock to a raised position whereby the display cards C can be readily removed from the binder.

In order to hold the lock in its lowered position in locked engagement with the cards, a latch lever 88 is provided and this latch lever is pivotally connected at its lower end to the front wall 30 of the base of the binder A and is provided with a locking tooth 89 for engaging in a suitable notch formed in the foot 86 of the section 83 of the said lock. This latch lever 88 is normally held in the path of and in engagement with the foot 86 of the section 83 of the lock by means of a suitable leaf spring 90. The upper end of the lever 88 protrudes above the inner face of the base, so that the same can be conveniently operated by the thumb of the user of the binder, so that the latch lever can be moved from out of engagement with the lock when it is desired to release the display cards.

In order to facilitate the closing of the binder against the tension of the springs 50, handles 91 are secured to the opposite sides of the rear section 29 of the binder A and thus by grasping the said handles 91 and pushing in on the front section of the binder, the binder can be readily moved to a closed position.

Figure 1:
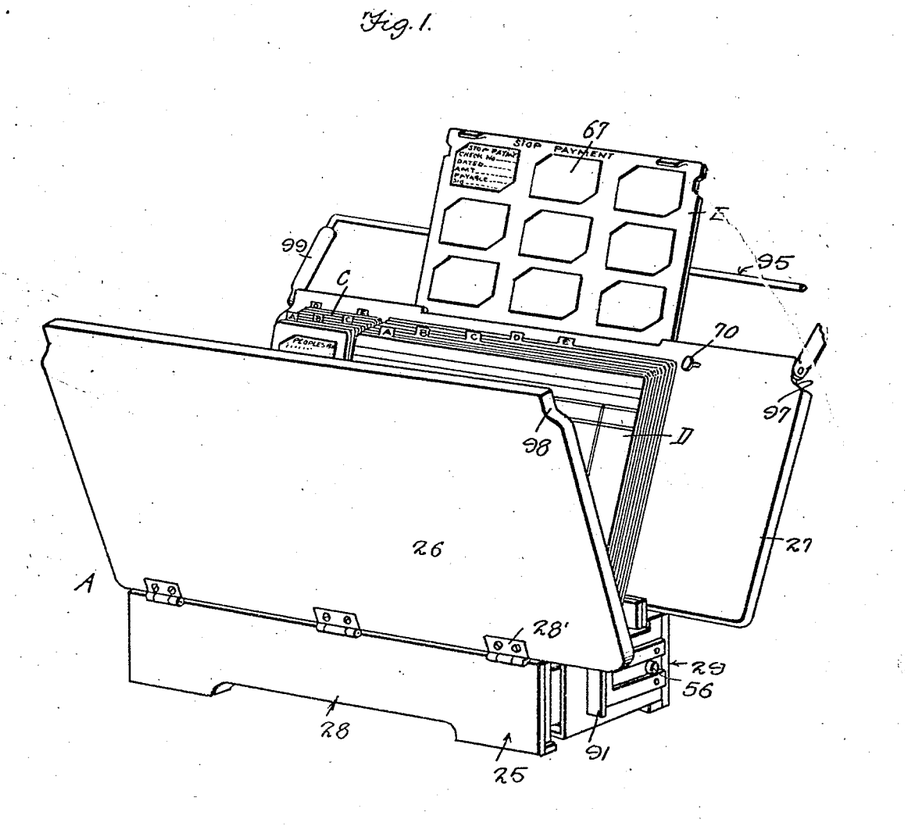
Figure 1 is a perspective view of the improved appliance showing the same in its open position with the ledger sheets, signature display cards and the stop-payment display cards in proper position.
Figures 2, 3, 4:
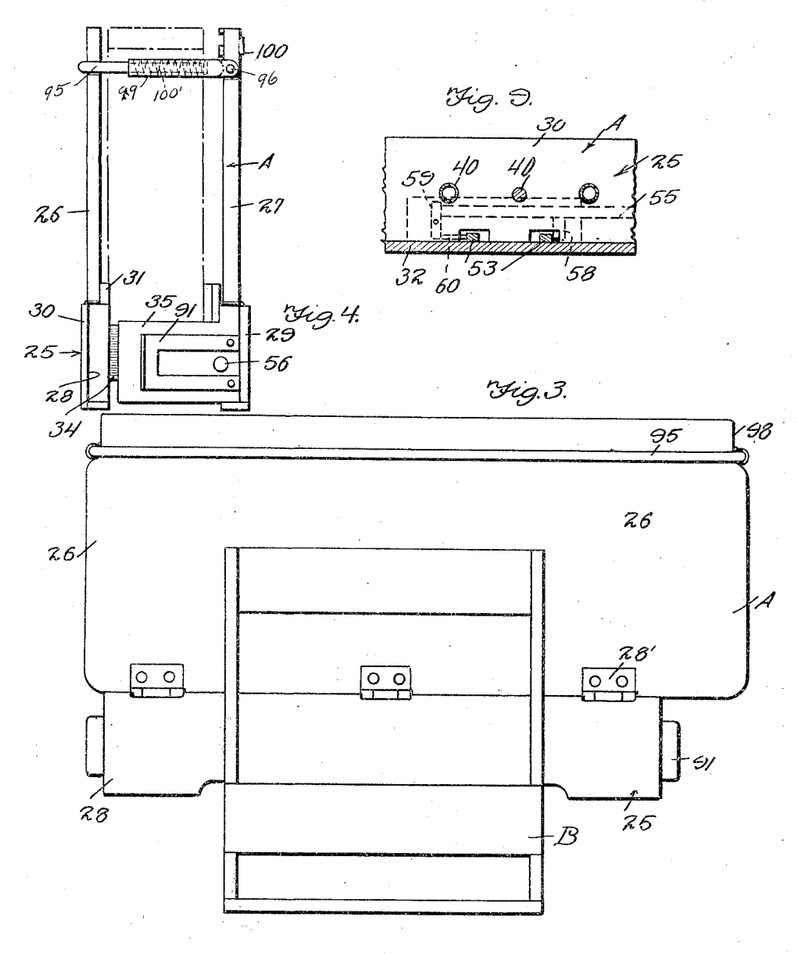
Figure 3 is a front elevation of the improved appliance closed and in its supporting stand.
Figure 4 is an end elevation of the improved appliance showing the same in its closed locked position.
Figure 5:
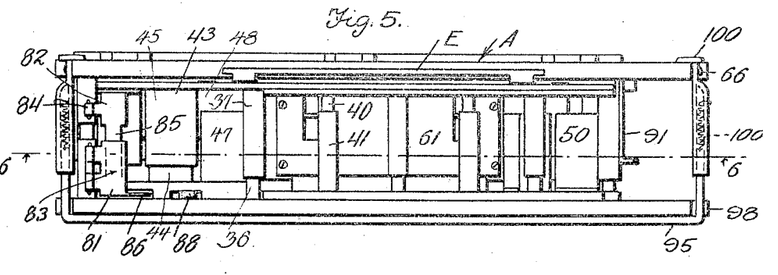
Figure 5 is a top plan view of the improved ledger binder with the signature display cards and the ledger sheets removed therefrom to disclose the construction thereof.

In order to hold the covers against opening swinging movement when the binder is in its closed position, I provide an expansible U-bar 95 and the legs of this bar are pivotally connected as at 96 to the rear cover 27 of the binder adjacent to the upper edge thereof and the side edges of the cover can be notched as at 97 for receiving the said legs of the U-bar. The corresponding corners of the front cover 26 are notched as at 98 so that the U-bar can be swung in engagement with the front cover and thus effectively hold the covers connected together against opening movement. As stated the U-bar is of an expansible character and is telescoping as at 99 to accommodate itself to various thicknesses of the ledger and is provided internally with a telescoping section and the springs 100', Figure 4, which yieldingly draw the U-bar into closed position. Stops 100 are carried by the rear face of the cover 27 and are arranged in the path of the U-bar so as to normally hold the same in a raised upright position whereby the U-bar will form a support for the stop-payment card or board E when the same is in its raised position as clearly shown in Figures 1 and 2.

In Figures 20 to 25 inclusive I have shown a modified form of the improved ledger binder and this binder is generally indicated by the reference character F and is of substantially the same construction as the preferred form.

In this form the binder F also embodies a base 110 having hingedly connected thereto as at 111 the front and rear covers 112 and 113. The front cover 112 is substantially the width of the display card C for the signature cards 75 while the back cover 113 is substantially the width of the card C plus the length of the back of the ordinary or standard ledger usually known as the Kalamazoo or Baker-Vawter ledger binders and the height of which is that of the back without the binder of such ledgers; so that, upon placing the binder F against such standard ledgers, the binder may be used in the nature of an attachment to such standard ledgers. The back 113 carries downwardly extending guide legs 114 which are slidably received in arcuate bridges 115 secured to the sides of the base 110, so that the swinging movement of the cover 113 will be limited. The covers 113 and 112 are adapted to be normally maintained in their closed positions by the use of a telescopic U-shaped bar 116, which is hingedly carried by the back 113 and which is adapted to be swung over the upper edge of the front cover 112, similar to the U-bar described in the preferred form.

The base 110 also embodies front and rear sections 117 and 118 which are movable toward and away from each other so as to permit the expansion and contraction of the binder and the front and rear sections are provided with suitable interfitting guides as clearly shown in the drawings and indicated by the reference character 119. The intermediate telescoping guide 120 of the binder is formed so as to fit within the notches 78 formed in the lower ends of the display cards C for the signature cards and these cards are adapted to be held locked within the base by the use of a suitable card lock 121 which is of substantially the same construction as the card lock shown in the preferred form. The base is held in its contracted position by the use of a suitable rack bar 122 carried by the rear section 118 of the base 110 and a pivoted pawl or dog 123 carried by the front section 117. This pawl or dog 123 is adapted to normally engage the teeth of the rack bar 122 so that the sections will be held against opening movement. A leaf spring 124 is provided for the purpose of holding the pawl against said rack bar. It is to be noted that the pawl or dog 123 is pivotally mounted at a point intermediate its ends to the section 117 and that the outer end thereof extends through the front wall of the section 117 to form a handle 125, whereby the dog can be readily rocked, so as to permit the disengagement thereof with the rack bar and thus allow the opening movement of the binder.

The extended portion of the cover 113 is also provided with a suitable pocket 126 having the front transparent panel 127 and this pocket is adapted to slidably receive the stop-payment display card or board E, carrying the stop-payment cards 67 and this display board is adapted to be held in its raised or lowered position by the use of suitable sliding latches 128 which fit in notches 129 formed in the edges of the said display board.

From the foregoing description, it can be seen that I have provided a novel banking appliance in which signature cards, stop-payment notices and ledger sheets will be brought together in a single unit, so that all three of these elements will be simultaneously before the eye of the bookkeeper or other proper bank official.

Changes in details may be made without departing from the spirit or scope of this invention, but:

What I claim as new is:

1. A ledger binder comprising a pair of cover members and spring means normally holding the cover members spaced apart, and provided with receptacles for holding ledger sheets and signature cards, and means for holding the cover members in predetermined positions against the tension of the spring means.

2. The combination, with a pair of ledger cover members, of means associated with the covers for mounting ledger sheets therebetween and means for mounting signature cards therebetween, and means for mounting stop-payment notices.

3. The combination, with a ledger case, of means in the ledger case for holding ledger sheets, signature cards and stop payment notices in displaying position.

4. In combination, a ledger case including a pair of sections, a pivoted cover for each section, spring means for holding the ledger sections in spaced relation, means for holding the sections in predetermined position against the tension of the spring means, and means for holding the free ends of the ledger covers yieldingly together.

5. In combination with a ledger including a pair of pivoted covers, a U-member pivotally carried by one of the covers to engage the other cover and normally holding the free ends of the covers toward one another.

6. In combination with a ledger including covers, an extensible U-shaped member resiliently held in closed position pivotally secured to one cover and adapted to embrace the free end of the other cover to hold the covers in closed position.

7. In combination, a ledger binder including a pair of sections provided with means for resiliently tending to hold the sections spaced apart and provided with a rack bar and a pawl cooperating with the rack bar for holding the binder in selective partly closed positions.

8. In combination, a ledger binder including a pair of sections provided with means for resiliently tending to hold the sections spaced apart, a rack bar carried by one section of the binder, a pivoted pawl carried by the other section of the binder for engaging the rack bar for holding the binder in selective partly closed positions, and means for operating the pawl from one side of the binder.

9. In combination, a ledger binder including a base consisting of a pair of movable sections adjustable toward and away from each other, resilient means normally tending to move the sections to an open position, covers carried by the sections, a rack bar carried by one of the sections having rack teeth formed on its opposite edges, a pair of pivoted pawls carried by the other section for engaging the teeth of the rack bar, a push rod operatively connected with the pawls for synchronously moving the same out of engagement with the rack teeth, and a thumb piece carried by the outer end of the push rod and located at one end of the binder.

10. An attachment for a ledger comprising a member provided with an elongated back adapted to take the place of one of the covers of the ledger and provided with means for displaying the stop-payment notices.

11. An attachment for a ledger comprising a stop-payment file adapted to extend in rear of the ledger cover.

12. A ledger binder comprising a base, signature display cards fitted within the base, each having a notch formed in its side edge providing a stop shoulder, a pivoted lock bar carried by the base for movement into and out of engagement with said shoulders for holding display cards in position, spring means normally holding the lock bar out of engagement with the shoulders, and a releasable latch for engaging said lock bar to hold the same in card-holding position.

13. A ledger binder comprising a base including sections movable toward and away from each other, guide members carried by the sections for cooperation together, display cards fitted within the base having notches formed in their side edges defining stop shoulders, a telescopic locking bar pivotally associated with the sections of the base at one end thereof for movement into and out of the notches, and means for releasably holding the locking bar in locking position in engagement with said stop shoulders.

14. A ledger binder comprising a base, including sections slidably associated for movement toward and away from one another, pivoted covers carried by said sections, guide rods and tubes carried by said sections for interfitting engagement, a partition in said base of telescopic nature defining a signature display card section and a ledger sheet section, ledger sheets fitted in said last section having notches in their lower ends for fitting over said guide members, and means for releasably engaging the display cards for holding the same against accidental displacement.

15. A ledger binder comprising an expansible base, means for holding the base in varying partly closed positions, front and rear pivoted covers associated with the base, a telescopic partition in said base defining a signature-display-card section and a ledger-sheet section, the rear cover of the ledger being provided with a pocket having a transparent panel, a display board slidably fitted within the pocket, and means carried by the rear cover for holding the display board in predetermined adjusted positions in the pocket.

In testimony whereof I affix my signature.

ANDREW J. NORMAN.